J. H. ANTHONY.
LOG AND LUMBER WAGON.
APPLICATION FILED MAR. 14, 1908.
927,206.
Patented July 6, 1909.
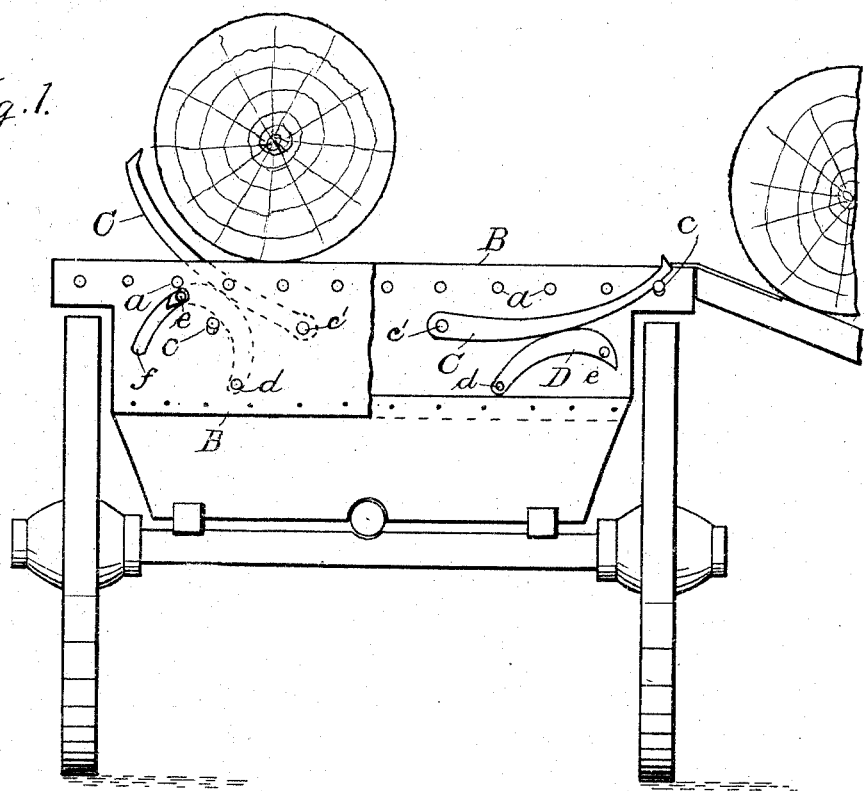
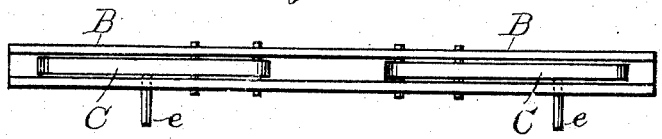
Witnesses
Inventor
John H. Anthony.
By Thomas P. Simpson.
Attorney

UNITED STATES PATENT OFFICE.

JOHN HENRY ANTHONY, OF HICKMAN, ARKANSAS.

LOG AND LUMBER WAGON.

No. 927,206.  Specification of Letters Patent.  Patented July 6, 1909.

Application filed March 14, 1908. Serial No. 421,096.

*To all whom it may concern:*

Be it known that I, JOHN HENRY ANTHONY, citizen of the United States, residing at Hickman, in the county of Mississippi and State of Arkansas, have invented new and useful Improvements in Log and Lumber Wagons, of which the following is a specification.

The invention has for its object to improve log and lumber wagons by employing dogs which will, both as holders for the logs and standards for the lumber serve two useful purposes.

My device will not only save time by preventing the logs from rolling about and requiring to be held in position by hand or otherwise, but will serve equally well to hold lumber in place instead of the usual standards.

Figure 1 of the drawing, showing my invention applied to the running gear of a wagon, is an elevation, Fig. 2 a plan view.

In the drawing, B B represent two plates bolted at the front and rear of the wagon body, while between each pair of plates B B, I pivot at $c'$, $c'$, the inner ends of the dogs C C and at $d$, $d$, the inner ends of the cam levers D D, the former being set at any desired angle so as to hold the log or logs and prevent rolling. The points of the dogs need not be used to penetrate the log or logs, small in diameter.

The plates B, B, are bolted to the bunks of the wagon while the dogs and the cam levers are pivoted between them, as clearly shown in Fig. 1 of the drawing. Each cam-lever D is provided with a handle $e$, which projects rearwardly through a curved slot $f$ in the rear plate B.

Pins $c$ pass obliquely down through holes $a$ in the plates B in order to hold the dogs at any degree of adjustment, while the cam levers D are used to relieve the pins when the logs are being unloaded.

The mode of operation is to raise the free end of each dog C into contact with an adjacent log on the wagon and to insert a pin $c$ beneath it, to maintain the dog in position. In order to unload the logs, raise a cam-lever D until the pressure of the log upon the pin $c$ is relieved sufficiently to remove said pin, which is then withdrawn and the dog C is permitted to fall into its lowest position.

Having thus described all that is necessary to a full understanding of my invention, what I claim as new and of my invention is:

In a log and lumber wagon, plates secured to the wagon bunks, between each pair of said plates and pivoted thereto the dogs C, and cam-levers D beneath said dogs, said plates having pin holes and curved slots therein, pins for said holes, and handles on said cam-levers projecting through said curved slots whereby said cam-levers are raised into contact with said dogs for the purpose specified.

In testimony whereof I affix my signature, in presence of two subscribing witnesses.

JOHN HENRY ANTHONY.

Witnesses:
E. F. McLEIGH,
J. K. SARTAIN.